Dec. 15, 1959  C. E. BRICKER ET AL  2,916,884
COMPOUND PRESSURE BOOSTER
Filed Dec. 26, 1957
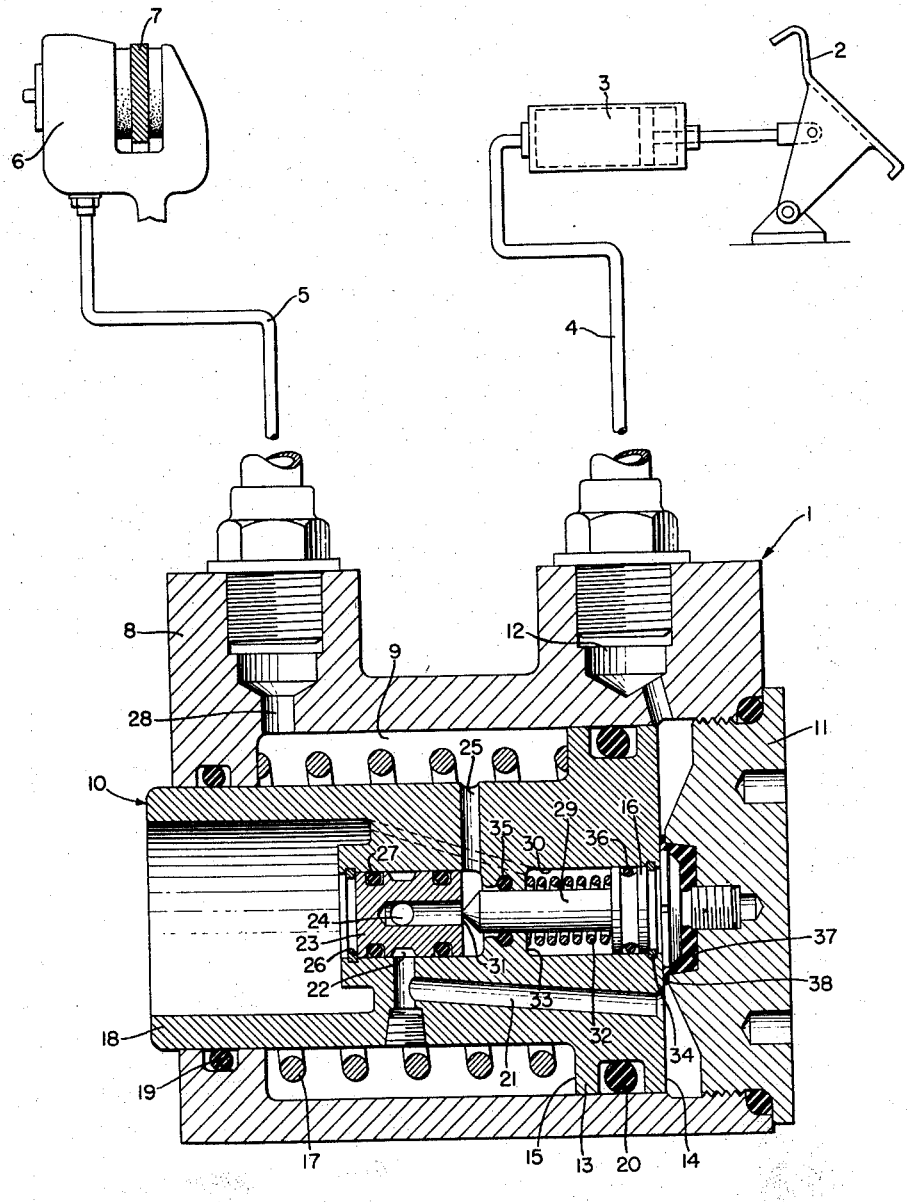
INVENTOR.
CARL E. BRICKER
JOHN W. RUNNER
BY
ATTORNEY

United States Patent Office 2,916,884
Patented Dec. 15, 1959

2,916,884

COMPOUND PRESSURE BOOSTER

Carl E. Bricker, Cuyahoga Falls, and John W. Runner, Akron, Ohio, assignors to The Goodyear Tire & Rubber Company, Akron, Ohio, a corporation of Ohio Application December 26, 1957, Serial No. 705,166

3 Claims. (Cl. 60—54.6)

This invention relates to brake systems, and especially to a compound pressure booster particularly adapted for use in brake systems for providing improved functioning thereof.

In all brake constructions, clearance must be provided when the brake is inoperatively positioned. Thus, in every instance upon brake application, the initial forces applied serve to move the brake mechanism to take up the brake clearance in the brake assembly. In hydraulic braking systems as used today, the application of pressure to a brake pedal, for example, will normally operate through a brake master cylinder to transmit desired braking pressure to a brake cylinder. It is very desirable in brake action to use high braking pressures as then reduced area brake pistons may be used. Then the brake fluid output of the master cylinder required to bring the brake linings to braking positions also is reduced. In order to obtain the equivalent braking action of other systems, the reduced area brake piston systems should have increased force brake pressures exerted thereon.

The general object of the present invention is to provide a brake characterized by the provision of a multi-pressure braking system wherein low pressures can be applied for the brake take-up action and wherein high braking forces and pressures are required only after the slack has been taken up in the mechanism and actual braking action will be secured.

A further object of the invention is to provide a braking system specially adapted for use with brakes having reduced effective brake piston area.

Another object of the invention is to provide a new and improved type of a compound pressure booster adapted to be connected in a hydraulic system for initially transmitting low pressure and small amounts of pressure fluid therethrough without change but for automatically changing its setting when predetermined output pressure conditions exist in the system and thereafter require greater input pressures in the apparatus with consequent multiplied output pressures due to a change in setting of the compound pressure booster.

Another object of the invention is to provide apparatus of the class described wherein a compact, effective pressure booster means is provided in the apparatus for changing the operating pressures in a brake cylinder after the brake slack has been taken up and when actual braking forces are to be exerted.

A further object of the invention is to provide a compound pressure booster for a hydraulic system wherein bore means are provided for connecting the input and output sides of a control piston in the booster and wherein a by-pass valve and control piston are provided for closing such bore means when predetermined output pressures exist in the hydraulic system.

Yet another object of the invention is to provide a pressure booster of the class described wherein a resilient gasket means is provided to eliminate by-pass valve closing action on intermediate pressure surges before higher operating pressures are established in the system.

The foregoing and other objects of the invention will be made more apparent as the specification proceeds.

For a better understanding of the invention, attention is directed to the accompanying drawings wherein a vertical section through a compound pressure booster embodying the principles of the invention is provided and with such pressure booster being shown diagrammatically connected to brake means including a master cylinder and a brake cylinder.

When referring to corresponding parts shown in the drawings and referred to in the specification, corresponding numerals are used to facilitate comparison therebetween.

In general, the present invention relates to the combination in braking apparatus of a master cylinder, brake means connected to the master cylinder to set up braking forces therein, a brake cylinder having brake means operatively controlled thereby, and a pressure booster operatively connected intermediate the master cylinder and brake cylinder. The pressure booster comprises means for defining a pressure chamber, a compound piston slidably received in the pressure chamber and having an input face of larger area than the output face thereof, a member providing a by-pass valve seat carried by the piston, which piston and member have bore means therein connecting between the input face and output portion of the pressure chamber, the valve seat connecting to and forming a part of the bore means, and a by-pass valve slidably carried by the piston and controlled by an auxiliary piston to close the bore means by seating on the by-pass valve seat when predetermined pressures are exerted on the input face side of the piston for changing the flow path of brake pressure fluid applied to such piston.

Attention now is directed to the details of the structure shown in the drawings, and a compound pressure booster of the invention is indicated as a whole by the numeral 1. Such pressure booster 1 is connected in a braking system comprising conventional means such as a brake pedal 2, that is operatively connected to a brake master cylinder 3 for setting up desired braking forces in the fluid system connected thereto and controlled thereby. Thus a conduit 4 is shown connecting the output of the master cylinder 3 to the input side of the pressure booster 1 while a second conduit 5 connects the output liquid from the pressure booster 1 to a brake cylinder 6. A conventional brake disc 7, or equivalent member is connected to and controlled by the brake cylinder 6 for braking action on a wheel, disc, or equivalent means (not shown) with which the brake cylinder 6 is operatively associated. The pressure booster 1 is of the type adapted to transmit low pressure braking forces therethrough without any change in such braking fluid pressures, whereas the pressure booster will function to change the liquid circuit flow path therethrough and action thereof when higher braking forces are required to set up relatively large braking forces for braking action.

The compound pressure booster 1 includes a suitable frame means 8 for defining a pressure chamber 9 in which a compound piston 10 is slidably received. An end cap 11 is shown secured to the frame 8 to close the pressure chamber 9. Brake pressure fluid from the master cylinder 3, or other system to which the pressure booster 1 of the invention may be secured flows through an inlet bore 12 connecting to the inlet conduit 4 and this fluid then flows into the input side of the pressure chamber 9. The compound piston 10 includes a main piston 13 that has an input pressure face 14 and an output face or section 15, which output face or portion is of some fractional area of the area of the input face 14 and may, for example, be one-half the area of such input face in order to provide for pressure boosting action within the pressure booster 1. An auxiliary piston 16 is carried by the main piston 13 on the input face thereof. A return spring 17 is based on a part of the frame 8 and bears on the output face 15 of the main piston 13 to urge it normally to a position adjacent or against the end cap 11 for transmission of low pressure fluid through the pressure booster without any change in the setting of the components of the pressure booster, or of the pressure on the hydraulic fluid received in and passing through the pressure booster. The main piston 13 is shown with an output section, or piston rod 18 integrally connected therewith, which section is slidably engaged with a portion of the frame 8 and may extend therefrom. Suitable O-rings 19 and 20 are engaged with the frame 8 to seal against the output section 18 of the main piston 13 and to seal intermediate the input and output faces thereof, respectively.

A low pressure fluid transmission path is provided in the compound piston 10 by means of a by-pass bore 21 formed in the input face 14 of the piston and connecting to a circumferentially extending groove, or bore means 22 provided in a member 23 received in and carried by the main piston 13 in the output section 18 thereof. Such groove 22 communicates with an axially extending bore 24 in the member 23 and it, in turn, connects to a second by-pass bore 25 extending substantially radially of the main piston 13 in the output section 18 thereof and connecting to the output pressure zone of the pressure chamber 9. This member 23 is held in the main piston 13 against any appreciable or lengthy axial movement by means of a lock washer 26, or equivalent member and any desired conventional gaskets 27 are carried by peripheral portions of the member 23 on opposite sides of the groove 22 to seal the pressure fluid in the groove 22 and connecting bore means. Hence, when low pressure braking conditions exist in the brake means, low pressure hydraulic fluid supplied to the booster 1 flows into the input side of the pressure chamber 9, through the by-pass bore 21 and connecting bore means including the groove 22, bore 24 and bore 25 to the output conduit 5 by means of a bore 28 provided in the output end of the pressure chamber 9.

A by-pass valve 29 is received in a bore 30 provided in the main piston 13 and is controlled by the auxiliary piston 16. The by-pass valve 29 is adapted to seat on a by-pass valve seat 31 provided at the end of the bore 24 of the member 23. Thus when closed, the by-pass valve 29 effectively shuts off flow of liquid from the input pressure side of the pressure chamber 9 to the output chamber or side thereof. A valve spring 32 normally is seated between a shoulder 33 provided in the bore 30 and the auxiliary piston 16 to urge such auxiliary piston 16 to seat against a lock washer 34 or equivalent stop member provided in the bore 30 adjacent the input face 14.

Conventional gaskets 35 and 36, such as O-rings, are carried by the main piston 13 to seal around the by-pass valve 29 and to seal the auxiliary piston 16 in the bore 30 in which it is received.

In operation of the pressure booster 1 of the invention, it will transmit low pressure braking fluids therethrough by the by-pass means previously described and when the slack has been taken up in a brake means, for example, and higher brake operating pressures are required, such higher output pressures will require higher input pressures to the pressure chamber 9 and start to cause axial movement thereof. In other words, the return spring 17 engaging the main piston 13 is of such a predetermined value that, when operating braking pressures are required in the brake cylinder 6 and associated means, the return spring 17 will then permit initial axial movement of the main piston 13 under such required input pressures. At the same time, the by-pass valve 29 will be forced onto its valve seat 31 by application of such slightly higher pressures to the auxiliary piston 16 which will move the auxiliary piston against the action of the return spring 32. The auxiliary piston 16 and by-pass valve 29 normally are of a unitary construction. Usually the return spring 32 can be set to permit closing of the by-pass valve under substantially the same input pressure as that required for starting axial movement of the main piston 13 against its return spring. As soon as the by-pass valve 29 is forced onto its valve seat 31, then the output pressure transmitted to the conduit 5 will depend upon the ratios of area of the input face 14 to the output face 15 of the main piston 13 and to the input pressure supplied to the pressure chamber 9. Should such ratio of areas be 2 to 1, then the output pressure supplied by the conduit 5 can be double that of the input pressure supplied by the conduit 4, and a controlled or limited quantity of liquid as received within the pressure chamber 9 on the output side of the main piston 13 can be forced from the frame 8 and pressure chamber 9 therein by any desired axial movement of the main piston 13. Obviously, the person actuating the brake pedal 2 will be required to place more force on the brake pedal during such period of effective braking action, but no great resistance has been set up in the apparatus for taking up the slack therein and moving the braking components into braking positions.

There is a sealing ring or gasket 37 carried by the end cap 11 and having a rib or bead 38 thereon which normally has the main piston 13 forced thereagainst so that input liquid received in the pressure chamber 9 will not initially contact the auxiliary piston 16 to attempt to close the by-pass valve 29. By this resilient sealing ring 37 and rib 38, any slight pressure surges which occur in the input fluid transmitted to the pressure chamber 9 can be passed therethrough through the bore means provided in the compound piston 10 for taking up the slack in the system and moving the braking components into braking position prior to any actual axial movement of the main piston 13. Thus some slight movement of the main piston 13 will be required before the input fluid normally contacts the auxiliary piston 16 to prevent closure of the low pressure by-pass conduit or bore means provided in the pressure booster prior to actual necessity for the setting up of high pressure output from the pressure booster 1.

From the foregoing, it will be seen that a relatively uncomplicated apparatus has been provided for performing effective braking actions using low fluid volumes. The system automatically transfers from low pressure take-up conditions over to high pressure braking operating conditions and saves the pilot work but yet provides rapid and effective braking action. Relatively small area braking pistons are used in the brake means of the invention and high ultimate brake pressures are used. It thus will be seen that a small volume of the low pressure liquid can be transmitted through the pressure booster 1 and that the booster means is adapted to provide, automatically, high pressure output liquid as required in the associated system.

While a certain representative embodiment and details have been shown for the purpose of illustrating the invention, it will be apparent to those skilled in this art that various changes and modifications may be made therein without departing from the spirit or scope of the invention.

What is claimed is:

1. A pressure booster comprising a frame means defining a cylindrical pressure chamber having a stepped bore therethrough, a closure member secured in the larger end thereof, a compound piston having a stepped peripheral surface and slidably secured in said pressure chamber with its large end slidably engaging the large bore of said chamber, said compound piston having an input face and an output face which is of smaller area than said input face; said compound piston having its output section of smaller diameter telescopically received in the smaller end of the bore of said frame means and extending therethrough, a replaceable member removable through the exposed small end of the compound piston providing a by-pass valve seat carried by said compound piston, said compound piston and said member having connecting passages providing a by-pass between said input face and a point in said output section of said compound piston, said valve seat connecting to and forming a part of said passages, a by-pass valve slidably carried by said compound piston axially thereof in its input face and adapted to close said by-pass by seating on said valve seat, said valve having an imperforate auxiliary piston head in sealed sliding engagement in an axial bore of said compound piston and closing said axial bore at all positions of the valve, said auxiliary piston head being adapted to close said by-pass valve by virtue of pressure applied thereto at the input face of said compound piston, spring means to hold said by-pass valve open until predetermined input pressure is applied to the auxiliary piston head, and spring means for holding said compound piston against movement until a desired pressure is set up on the input face thereof whereby low pressure fluid is transmitted through said connecting passages without change and proper build-up of the outlet pressure for said chamber produces movement of said compound piston and closure of said by-pass valve.

2. A pressure booster as defined by claim 1 in which the replaceable member providing the valve seat is slidably mounted in an axial bore of the compound piston and sealed thereto by deformable O-rings.

3. A pressure booster as defined by claim 1 in which the replaceable member providing the valve seat is retained in place by a spring ring.

References Cited in the file of this patent

UNITED STATES PATENTS

| | | |
|---|---|---|
| 2,351,953 | Goepfrich | June 20, 1944 |
| 2,381,930 | Schnell | Aug. 14, 1945 |
| 2,408,513 | Gunderson | Oct. 1, 1946 |
| 2,436,268 | Schnell | Feb. 17, 1948 |
| 2,463,173 | Gunderson | Mar. 1, 1949 |
| 2,597,404 | Teske | May 20, 1952 |
| 2,642,720 | Deardorff | June 23, 1953 |
| 2,737,777 | Krusemark | Mar. 13, 1956 |